Feb. 9, 1960 A. G. DEE 2,924,670

PORTABLE TELEPHONE-CONTROL UNIT

Filed April 30, 1954 3 Sheets-Sheet 1

INVENTOR.
ALFRED G. DEE
BY [signature]

Feb. 9, 1960 A. G. DEE 2,924,670

PORTABLE TELEPHONE-CONTROL UNIT

Filed April 30, 1954 3 Sheets-Sheet 2

*INVENTOR.*
ALFRED G. DEE

BY [signature]

Feb. 9, 1960 A. G. DEE 2,924,670

PORTABLE TELEPHONE-CONTROL UNIT

Filed April 30, 1954 3 Sheets-Sheet 3

INVENTOR.
ALFRED G. DEE
BY [signature]

2,924,670

PORTABLE TELEPHONE-CONTROL UNIT

Alfred G. Dee, New York, N.Y., assignor, by mesne assignments, to Dynamics Corporation of America, New York, N.Y., a corporation of New York Application April 30, 1954, Serial No. 426,774

4 Claims. (Cl. 179—146)

This invention relates to improved arrangements of radio telephone equipment for providing an integrated communication system for use, for example, in radio marine installations.

Many arrangements have been provided in the past for fulfilling the requirements of radio communications from shipboard. While the desired communication for any particular service has been attained by the present state of the art the arrangements heretofore provided have not been as convenient and flexible as would be desirable. Attempts which have been made to provide flexible systems invariably have increased the cost and complexity of the installation as well as failing to provide one or more features which are essential to a complete communication facility.

Accordingly, it is an object of this invention to provide an improved communication system.

Another object is to provide a multi-position radio telephone system having a portable receiver usable at any chosen position for reception and controlling a remote transmitter.

A further object is to provide a multi-position radio telephone system which provides selectively radio telephone communication from the operating position or intercommunication between operating position and multistation positions.

A still further object is to provide a multi-position radio telephone system which is compact and easy to use and utilizes in the portable receiver-control unit the handset as a carrying handle.

Another object is to provide for a receiver-control unit a new and improved bracket for a telephone handset.

These and other objects of the present invention will become apparent as the invention is better understood from the following detailed description taken in conjunction with the accompanying drawings wherein.

Figure 1:
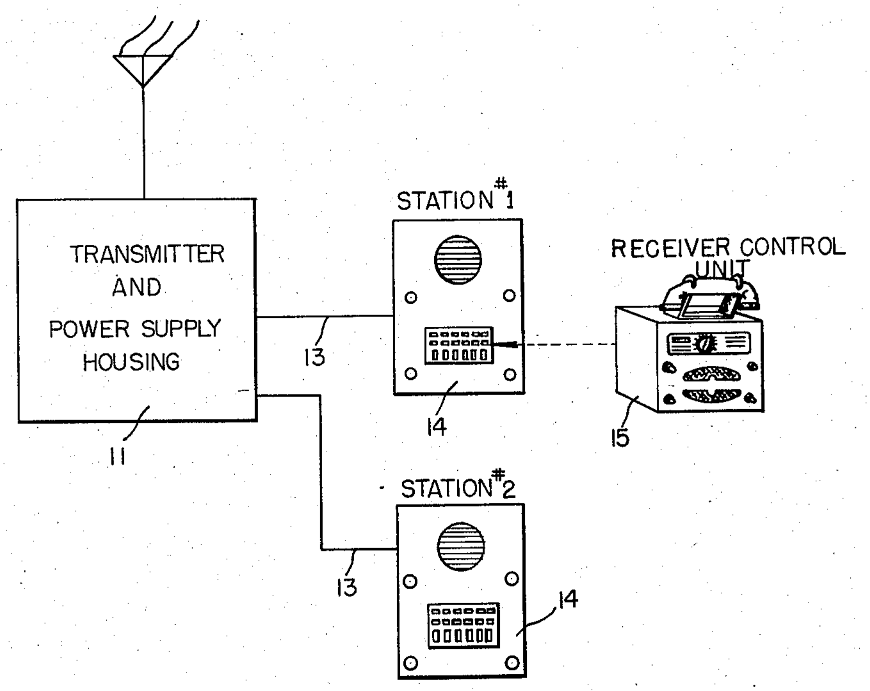
Fig. 1 is a block diagram representing apparatus arranged in accordance with the invention.

Referring to Fig. 1 the invention is shown as a marine radio telephone installation having a transmitter 11 with a conventional antenna 12 and coupled by means of multi-conductor cables 13 to remote station panels 14 which are located at any desired number of convenient positions aboard the craft. The transmitter 11, in addition to a conventional radio transmitter providing voice modulated transmission over the 2 to 18 megacycle band, includes power supply for the transmitter and receiver and electric control apparatus responsive to remote control of various quantities as will hereinafter appear. The cables 13 provide power, signal and control connections among the transmitter 11 and the stations 14.

The system of the present invention is completed by a portable receiver-control unit 15 which will be more fully described hereinafter. The receiver-control unit 15 can be readily carried about the craft and operatively associated with the most convenient station panel 14.

Figure 2:
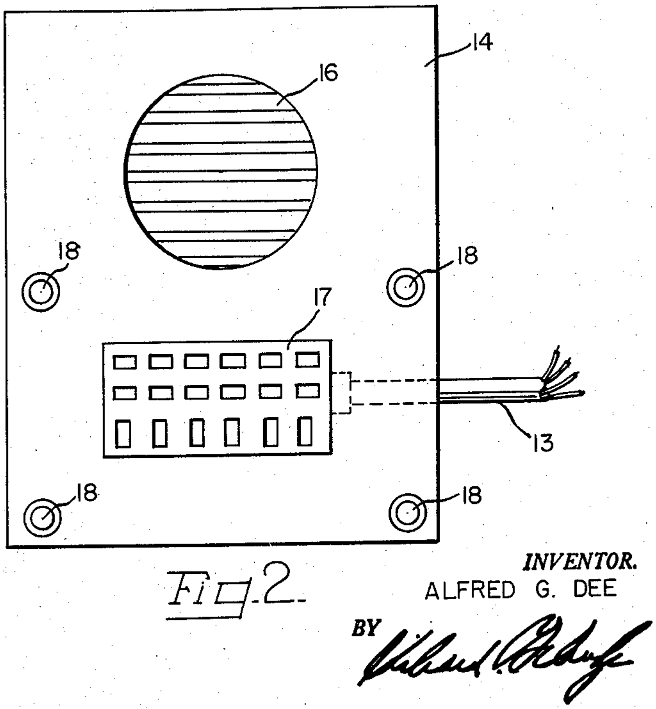
Fig. 2 is a front elevation of one of the multi-position station panels of the invention.
Figure 3:
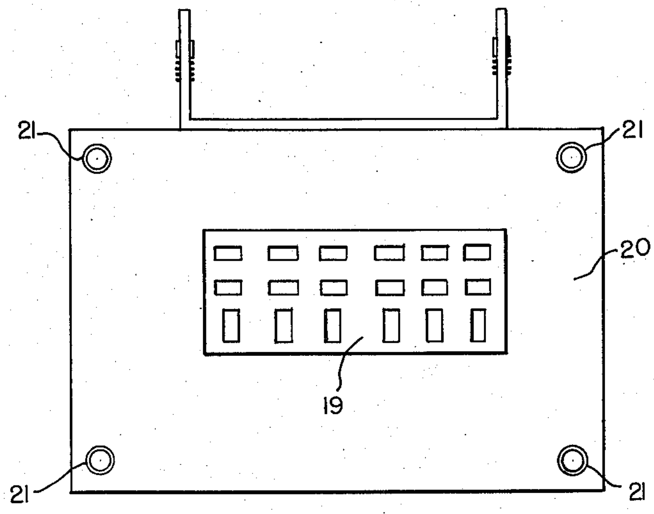
Fig. 3 is a rear elevation of the receiver-control unit.

The station panels 14 are shown in greater detail in Fig. 2. The panel 14 mounts a loudspeaker 16, a multi-conductor plug receptacle 17 and receiver supporting sockets 18. The receptacle 17 has the individual connectors thereof in circuit within the various signal, power and control leads, respectively, of the cable 13. The sockets 18 are arranged to position and support the portable receiver unit in a manner to engage connections to the circuits of the receptacle 17 from a mating plug 19 on the rear of the receiver unit 15 as shown in Fig. 3. For this purpose snaplock pins 21 are arranged on the rear of the receiver 15 for supporting engagement with the sockets 18.

Figure 4:
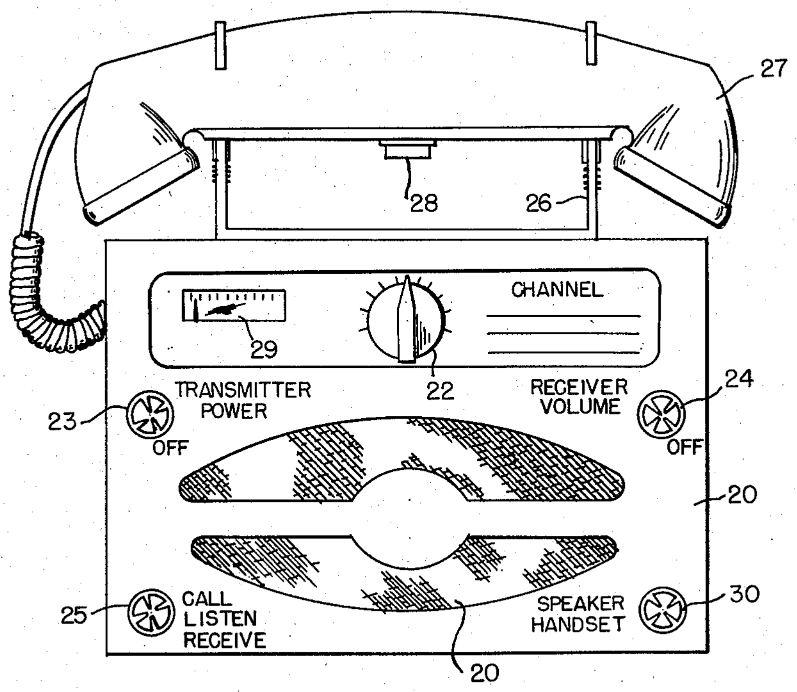
Fig. 4 is a front elevation of the portable receiver-control unit of the invention.

In Fig. 4 the front of the receiver 15 is shown having the various controls provided by the present invention and a self-contained loudspeaker 20. The receiver proper may be of a well-known type having, say, ten crystal controlled channels selectable by a bandswitch 22. The switch 22 in addition to acting as a band selector for the receiver 15 provides remote control via cables 13 of ten corresponding crystal controlled channels of the transmitter 11. It will be understood that the remote control of the transmitter 11 from the receiver-control unit 15 may be accomplished by any desired well-known arrangement for this purpose which can be chosen to be compatible with other requirements of the system. For example, continuous control can be achieved with the well-known Selsyn transmitter and receiver arrangement. Predetermined settings of multiple choice circuits or of stepped values, such as spaced frequency channels, can be remotely controlled by selective switching or follow-up relay control, for example. Magnitude control of certain quantities may be remotely controlled directly by means of potentiometers, for example. Arrangements for obtaining remote control in various manners are well-known in the art and the selection of any such particular arrangement for the practice of the present invention will be within the knowledge of those skilled in the art. The disclosure of particular remote control apparatus, therefore, is not deemed to be necessary to an understanding of the present invention.

The receiver 15 further provides a transmitter output power control 23 for adjustment of the power of the transmitted radio frequency to a desired level. This control 23 preferably includes switch means for energizing and de-energizing the transmitter power supply by means of a control relay associated with the power supply in the transmitter 11. The receiver 15 has a volume control 24 with a switch which provides relay control of the energization of the receiver power supply in the transmitter 11. For the purpose of providing intercommunication to the various stations 14 an intercommunication switch 25 positioned at "Receive" selectively connects the loudspeaker 20 of the receiver 15 for reception of radio signals produced by receiver 15 or when positioned at "Call" as a microphone for intercommunication with the speakers 16 of the station panels 14 to which the receiver 15 is not engaged. Conversely, switch 25 when repositioned to "Listen" connects the loudspeaker 20 of the receiver 15 to function as a loudspeaker for reception of intercommunication signals from speakers 16 of the station panels 14 which are functioning as microphones through re-connections instituted by the re-positioning of switch 25.

A feature of the receiver 15 enhancing the convenience and portability of the equipment are the brackets 26 which are secured to the top of the unit 15. The brackets are arranged removably to retain a handset 27 which has a push-to-talk switch 28. With the handset 27 retained in the brackets 26 a convenient carrying handle is provided without increasing the weight of the unit 15.

The receiver 15 has an indicating meter 29 connected to selectively indicate the relative percentage to full transmitter power being used or the intensity of received signals in accordance with the transmit or receive position of the switch 28. The system is completed by a switch 30 for selecting the reception of radio signals with the ear piece of the handset 27 or the local speaker 20.

Figure 5:
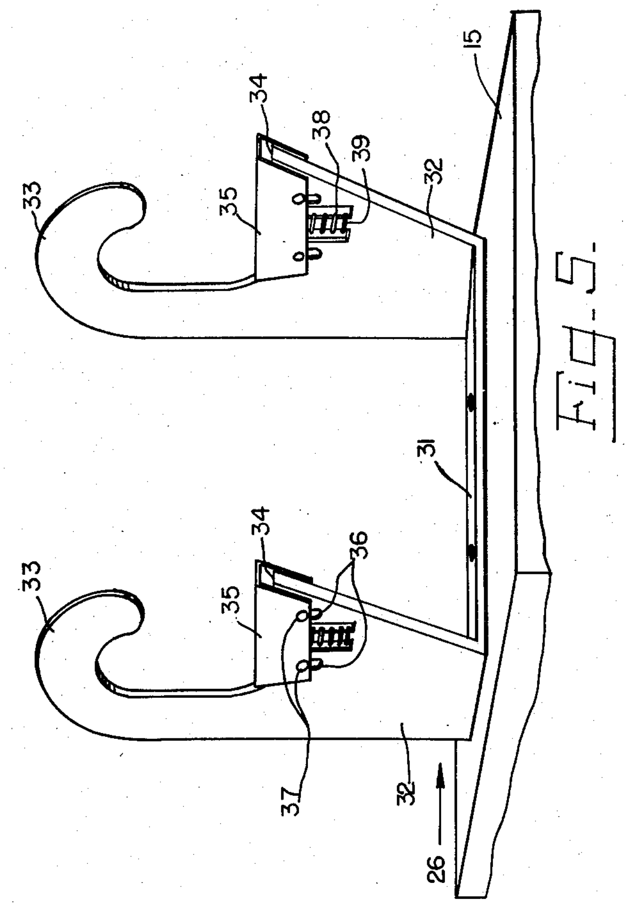
Fig. 5 is a perspective view of the handset bracket used on the receiver control unit.

In Fig. 5 the bracket 26 is shown mounted to the receiver 15 by a base 31 which supports spaced vertical members 32. The members 32 terminate in an open hook 33 opposed to a flat surface 34 recessed thereunder. Mounted over the surfaces 34 are sliding clips 35 which have an inverted U-shape for a sliding fit with the portions of the members 32 beneath the surfaces 34. The clips 35 are retained and guided with respect to the members 32 by closed slots 36 therein and rivets 37 which are secured to the walls of the bracket 35. A compression spring 38 urges each bracket 35 toward the position where the rivets 37 are stopped by the upper end of slots 36. The spring 38 is positioned by a guide post 39.

Figure 6:
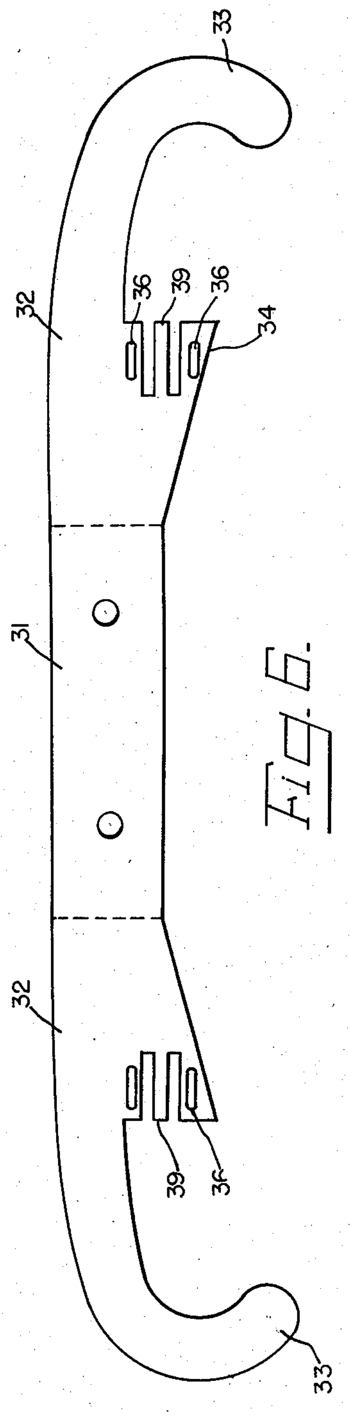
Fig. 6 is a plan view of the handset bracket before final assembly.

The bracket 26 may be folded from a sheet as shown in Fig. 6 wherein the various portions are stamped in one operation and 90° folds made at the dotted lines.

The operation of the bracket constructed in accordance with the present invention permits the handset 27 to be inserted under the hooks 33 by depressing the sliding clips 35. Thereafter the handset provides a carrying handle for the receiver 15 and is firmly retained due to the upward urging of the clips 35. By depressing the handset 27 slightly it can be readily removed.

It will be apparent from the foregoing description that a complete communication system is provided by the present invention with a minimum of equipment. With the portable unit 15 complete control of radio telephony or intercommunication can be achieved from any of the stations 14 without duplication of the transmitting or control equipment.

Various changes and modifications of the invention will be apparent to those skilled in the art and are to be understood as within the spirit and scope of the appended claims.

I claim:

1. A portable receiver-control unit comprising a case, a U-bracket mounted on the top of said case, the upper arms of said bracket terminating in inverted hook portions, a pair of sliding clips opposed to the inner portion of said hook portions, means urging said clips upwardly to predetermined positions, and a telephone handset operatively connected to said unit and removably retainable under said hook portions by the urging of said clips, said handset in retained position forming a carrying handle for said unit.

2. A portable telephone unit comprising, a case, a U-bracket mounted on top of said case, the upper arms of said bracket terminating in inverted hook portions, a telephone handset operatively connected to said unit and removably retainable under said hook portions, the said handset in retained position forming a carrying handle for said unit, and spring means for retaining said handset under said hook portions in carrying handle position.

3. The portable telephone unit of claim 2 wherein the handset is provided with a talk-listen switch positioned substantially intermediate its length and the hook portions and handset retaining means are positioned at opposed sides of said switch.

4. A portable telephone unit comprising a case, inverted hook means extending upwardly of said case, a telephone handset operatively connected to said unit and removably retained under said hook means to form a carrying handle for said unit, and upwardly urged spring means disposed beneath and opposed to said hook means for supporting said handset in removable engagement with the under surface of said hook means.

References Cited in the file of this patent

UNITED STATES PATENTS

| | | |
|---|---|---|
| 2,193,536 | Murdoch | Mar. 12, 1940 |
| 2,215,860 | Sengebusch | Sept. 24, 1940 |
| 2,250,936 | Schnell | July 29, 1941 |
| 2,433,290 | Mitchell et al. | Dec. 23, 1947 |
| 2,496,398 | Lambert | Feb. 7, 1950 |
| 2,531,215 | Harmon | Nov. 21, 1950 |
| 2,535,906 | Dillon et al. | Dec. 26, 1950 |
| 2,547,420 | Sumner | Apr. 3, 1951 |
| 2,647,959 | Mahoney | Aug. 4, 1953 |
| 2,670,435 | Mitchell | Feb. 23, 1954 |
| 2,684,436 | Dimmer | July 20, 1954 |

OTHER REFERENCES

Radio and Television News, August 1953, "Six-Meter Emergency Transceiver," page 56.